E. I. DODDS.
STAYBOLT STRUCTURE.
APPLICATION FILED OCT. 31, 1919.
1,373,057. Patented Mar. 29, 1921.
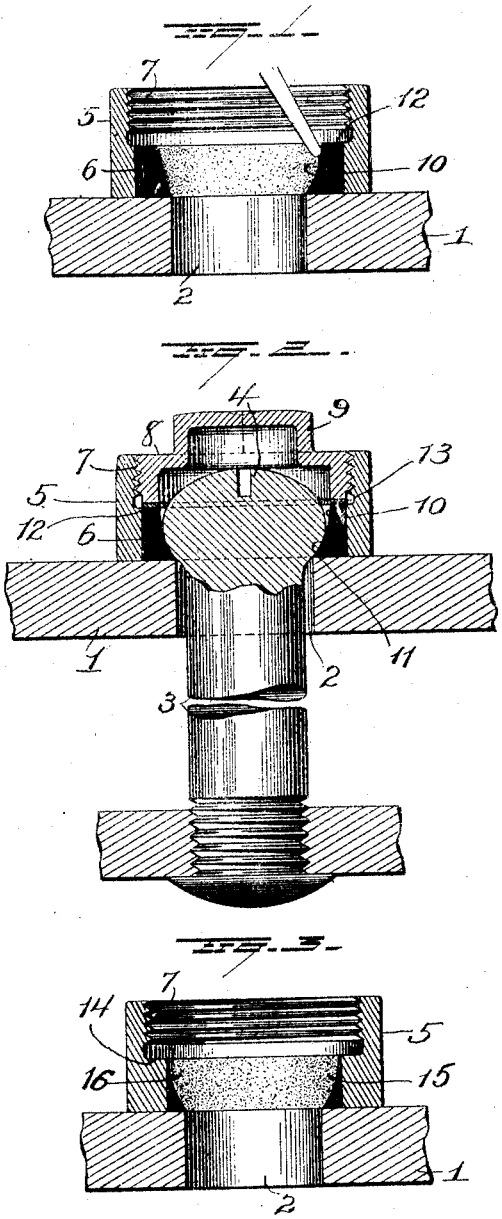
INVENTOR
E. I. Dodds
By Seymour Bright
Attorneys

UNITED STATES PATENT OFFICE.

ETHAN I. DODDS, OF PITTSBURGH, PENNSYLVANIA, ASSIGNOR TO FLANNERY BOLT COMPANY, OF PITTSBURGH, PENNSYLVANIA.

STAYBOLT STRUCTURE.

1,373,057.

Specification of Letters Patent.

Patented Mar. 29, 1921.

Application filed October 31, 1919. Serial No. 334,780.

*To all whom it may concern:*

Be it known that I, ETHAN I. DODDS, citizen of the United States, and a resident of Pittsburgh, in the county of Allegheny and State of Pennsylvania, have invented certain new and useful Improvements in Staybolt Structures; and I do hereby declare the following to be a full, clear, and exact description of the invention, such as will enable others skilled in the art to which it appertains to make and use the same.

This invention relates to improvements in staybolt structures,—one object of the invention being to provide a housing for the head of the bolt and in which said head has its bearing, which housing shall be welded to the boiler sheet so that the weld shall not be exposed.

A further object is to so weld a housing for a bolt head, to the boiler sheet that the weld may be utilized in providing a seat for the bolt head within said housing.

With these and other objects in view, the invention consists in certain novel features of construction and combinations and arrangements of parts as hereinafter set forth and pointed out in the claims.

In the accompanying drawings; Figure 1 is a view illustrating the manner of welding the housing to the boiler sheet; Fig. 2 is a sectional view showing the parts assembled, and Fig. 3 is a view of a modification.

1 represents an outer boiler sheet having a bolt opening 2, and 3 illustrates a staybolt which passes through said opening and is provided with a head 4 which may have a rounded contour.

A housing 5 is located against the boiler sheet around the opening 2 and spaced from the latter. A portion 6 of the interior of said housing may be made plain and another portion may be threaded as at 7 to receive the exteriorly threaded portion of a plug or closure 8,—the latter being made with an angular part 9 to receive a wrench.

The housing 5 is united integrally to the boiler sheet by a weld 10 which is built up, in the manner shown in Fig. 1, between the interior portion 6 of the housing and the opening 2 in the boiler, the alloy composing said weld cohering to the metal of the boiler sheet and the metal of the housing within the latter. After the weld 10 shall have been built-up as shown in Fig. 1, it will be formed or machined with the use of a suitable tool to provide a curved or rounded seat 11 for the head of the staybolt. The outer end of the weld may be formed to provide an abutment 12 for the inner end of the closure 8 and between the latter and said abutment, a gasket 13 may be interposed.

Instead of shaping the weld to provide an abutment for the closure, the housing may be formed with an annular shoulder or abutment 14 for the closure, and the weld 15 disposed between this shouldered portion of the housing and the opening 2, as shown in Fig. 3, thus minimizing the amount of welding alloy necessary to unite the housing to the boiler sheet and still provide a seat 16 for the head of the staybolt.

Having fully described my invention what I claim as new and desire to secure by Letters-Patent, is:—

1. The combination with a boiler sheet having an opening, and a staybolt having a head, of a housing for said head, and a weld extending upwardly within said housing and uniting the latter to the boiler sheet.

2. The combination with a boiler sheet having an opening, and a staybolt having a head, of a housing for the bolt head, and a weld within said housing and uniting the latter to the boiler sheet, said weld providing a seat for the bolt head.

3. The combination with a boiler sheet having an opening and a staybolt having a head, of a housing surrounding said opening and spaced therefrom, a weld between the interior wall of the housing and the opening in the boiler sheet and uniting said housing to the boiler sheet, a portion of said weld providing a seat for the head of the staybolt, a closure entering said housing and there being an abutment within the housing formed at the free end of said weld for said closure.

4. The combination with a boiler sheet having an opening, and a staybolt having a head, of a housing on the boiler sheet, a closure entering said housing, a weld within the housing and uniting the same to the boiler sheet, said weld providing a seat for the bolt head and an abutment for said closure.

In testimony whereof, I have signed this specification.

ETHAN I. DODDS.